United States Patent [19]  
Motsinger

[11] 4,049,597  
[45] Sept. 20, 1977

[54] GLASS FIBER SIZING COMPOSITION

[75] Inventor: Donald L. Motsinger, Forest City, N.C.

[73] Assignee: PPG Industries, Inc., Pittsburgh, Pa.

[21] Appl. No.: 685,842

[22] Filed: May 13, 1976

Related U.S. Application Data

[62] Division of Ser. No. 513,208, Oct. 9, 1974.

[51] Int. Cl.$^2$ .................................................. C08J 3/20
[52] U.S. Cl. ................................. 260/18 EP; 65/3 C; 260/18 S; 260/29.2 EP; 427/314; 427/401; 428/378; 428/392
[58] Field of Search .......... 260/18 EP, 18 S, 29.2 EP; 428/378, 392; 65/3 C; 427/314, 401

[56] References Cited

U.S. PATENT DOCUMENTS

| | | | |
|---|---|---|---|
| 3,249,412 | 5/1966 | Kolek et al. | 260/29.2 EP |
| 3,437,517 | 4/1969 | Eilerman et al. | 428/392 |
| 3,444,116 | 5/1969 | Gagnon et al. | 260/29.2 EP |
| 3,473,950 | 10/1969 | Wong | 65/3 C |
| 3,803,069 | 4/1974 | McWilliams et al. | 260/29.2 EP |
| 3,861,895 | 1/1975 | Tarazi | 65/3 C |
| 3,920,596 | 11/1975 | Furukawa et al. | 428/392 |

Primary Examiner—Eugene C. Rzucidlo  
Attorney, Agent, or Firm—John E. Curley

[57] ABSTRACT

A glass fiber sizing composition comprising a phenolic epoxy resin; the reaction product of a partial ester of a polycarboxylic acid which contains one or more unesterified carboxyl groups with a compound containing more than one epoxy group; a glass fiber lubricant; sufficient emulsifiers to impart a homogeneous mixture; a saturated fatty triglyceride; a silane coupling agent and a major amount of water. Glass fibers sized in accordance with the invention exhibit excellent reinforcing characteristics.

6 Claims, No Drawings

GLASS FIBER SIZING COMPOSITION

This is a division of application Ser. No. 513,208, filed Oct. 9, 1974.

DESCRIPTION OF THE PRIOR ART

Glass fiber strand is composed of a multitude of fine glass filaments which are formed from being drawn at a high rate of speed from molten cones of glass located at the tips of small orifices in a bushing such as is shown in U.S. Pat. No. 2,133,238. During forming the filaments are coated while moving at a speed on the order of 1,509 to 6,036 meters per minute with a size which contains a binder to give the strand integrity for workability for any standard textile or reinforcement use. The size also contains a lubricant for the filaments to prevent destruction of the strand by abrasion of the individual filaments against each other or against handling equipment.

When glass fibers are used for reinforcement of resin matrices, the sizing compositions on such glass fibers must have compatibility with the resin which forms the matrix to be reinforced. A primary source of glass fibers for reinforcement of resin matrices is in the form of glass fiber roving. Roving is formed by unwinding a plurality of strands from forming packages mounted on a creel, combining the strands in parallel form and winding the strands on a tubular support in a manner such that the combined strands can be unwound and processed. Such processing includes chopping, typically in the form of a high speed cutter through which the roving is passed.

The sizing composition applied to the glass fibers is of particular importance when chopped fiber glass strand is the desired end product. If the roving used to provide the glass strand does not have the proper size thereon, it will fuzz during the chopping operation and will be difficult to collect or to add to a liquid resin which is to be subsequently cured to form a reinforced article. Also an improper size will cause meshing, rather than chopping. Meshing is the phenomenon whereby the roving is crimped, i.e., not cut through, but merely bent rather than chopped; hence, making the fiber glass roving undesirable for many uses.

The use of chopped glass fiber roving has found particular utility in the area of panel manufacturing. Chopped panel roving forms the reinforcing portion of thermoset resinous panels. These panels are used for awnings, garage doors, carports, greenhouses and the like. Characteristically, these panels are translucent and in some cases transparent. A pigment or an opacifier may be added to the resin matrix to impart opacity or translucency to the final panel product.

These panels are formed by first coating a polyester resin on a nonadhering surface such as cellophane sheet. A uniform film of the resin at the desired thickness is applied to the sheet as it travels on a conveyor belt. Chopped glass fiber roving is uniformly disposed onto the polyester resin coating. A second nonadhering substrate is brought into contact with the first polyester resin with the glass fibers thereon. Subsequent to the forming of this sandwich, a kneading process is undergone which consists of contacting the sandwich with one or a multiplicity of rollers having varying configurations to uniformly distribute the glass fibers throughout the polyester resin. The sandwich is then passed through an oven which varies in temperature to both cure and impart thermal turbulence to the polyester resin. The thermal turbulence provides mixing means for the glass fibers to homogeneously blend the fibers with the resin so that the fibers may effectively reinforce the resin matrix. The oven temperature varies between about 95° C to 140° C., depending upon the curing temperature of the polyester resin and the degree of tubulence required to homogeneously mix the fibers with the resin matrix. After curing, the panel is sprayed or contacted with water in order to delaminate the cellophane or nonadhering film from the article. The panel is cut into desired lengths and packaged for shipment.

In order to form an acceptable panel roving, the glass fibers must have sufficient lubricity to be formed and sufficient integrity to be processed into roving and then subsequently chopped into discrete lengths (approximately 1 to 3 inches and preferably 2 inches in length). Also, the roving must have on its surface a size which imparts compatibility of the fibers with the reinforcing matrix.

The instant invention provides a sizing composition and a method of applying such size to glass fibers during forming which has sufficient lubricity and integrity for processing into panel roving and those processes necessary to the formation of the final panel. Further, the size has excellent wet-out so that it may be homogeneously mixed with the polyester matrix, i.e., the polyester resin matrix completely encapsulates the chopped glass fiber strand.

DESCRIPTION OF THE INVENTION

The invention involves treating glass fibers during their formation with an aqueous solution of a sizing composition comprising an aromatic epoxy resin; the reaction product of a partial ester of a polycarboxylic acid which contains one or more unesterified carboxyl groups with a compound containing more than one epoxy group; a glass fiber lubricant; sufficient emulsifiers to impart a homogeneous mixture; a saturated fatty triglyceride; silane coupling agent; and a major amount of water.

The epoxy resin useful in the practice of the invention is typically phenolic epoxies which are obtained by the reaction of a stoichiometric excess of an epihalohydrin such as epichlorohydrin with a polyhydric phenol such as bis(4-hydroxyphenyl) 2,2 propane, bis (hydroxyphenyl) methane (obtained by the acid condensation of two moles of phenol with one mole of formaldehyde), hydroquinone, resorcinol or with a polyhydroxyalcohol such as polyethylene glycol, sorbitol, glycerol, etc. Such compounds are characterized by the presence of terminal epoxy groups. These compounds are further described in U.S. Pat. No. 2,324,483; 2,444,333; 2,494,295; 2,500,600 and 2,511,913, the disclosures of which are incorporated herein by reference. By varying the proportions of the epihalohydrin, the polyhydroxy compound and/or by varying the reaction conditions, compounds of low, intermediate or higher molecular weights may be produced which range from liquids to solids. Typically, the molecular weights range between 300 and 900, and more preferably, between 300 and 400. This epoxy resin is used in an amount from about 18 to 22 percent and more preferably, between 20 and 21 percent based on the ingredients of the size composition other than water.

The epoxy resin is an effective film former and the epoxy functionality aids in the bonding of the glass fibers to the resin matrix. Also it is desired that the epoxy resins have such characteristics to be soluble in the resin matrix thereby imparting maximum compatibility between the glass fibers and polyester resin to be reinforced.

The reaction product of the partial ester of a polycarboxylic acid, which contains one or more esterified carboxyl groups, with a compound containing more than one epoxy group is formed by reactions known to those skilled in the art. Such reaction products are recited in U.S. Pat. No. 3,437,517. A preferred class of compounds which contain more than one epoxy group per molecule comprises diepoxy compounds containing at least one fused ring epoxy group, i.e. one of the epoxy groups being attached to adjacent carbon atoms which are located in a carbocyclic structure, such epoxys being disclosed also in U.S. Pat. No. 3,437,517, incorporated herein by reference. Polycarboxylic acids which may be used in preparing a polycarboxylic partial ester which contains one unesterified carboxyl group include for examle, oxalic, malonic, succinic, glutaric, adipic, suberic, azalaic, sebasic, maleic, fumaric, itaconic, citraconic and the like. The term "acid" as used herein and in the claims shall include the acid anhydrides where they exist. Characteristically, the final reaction product is that of a polycarboxylic acid which contains at least one esterified carboxyl group with a compound containing more than one epoxy group. This partial ester of a polycarboxylic acid with the epoxy compound is used in an amount from about 5 to 10 percent and preferably from 6 to 8 percent by weight of the sizing composition based on the ingredients other than water.

The lubricants which impart lubricity to the strand and/or which aid in further processing by increasing strand integrity, are typically of two classes: nonionic water insoluble lubricants and water soluble cationic lubricants. The water insoluble lubricant is typically a hydrogenated or saturated fatty acid ester of glycerol. Fatty acids by definition have 4 to 26 carbon atoms and in all cases an even number of carbon atoms per molecule. It is necessary that substantially saturated fatty triglycerides be used in the composition to reduce the oxidation of the sizing composition. The acid constituent of the saturated fatty acid esters usually have as a majority of their acid constituent, acids having from about 12 to 20 carbon atoms with only trace amounts of the lower and higher molecular weight acids being present. The use of these saturated fatty triglyceride lubricants has been limited and great difficulty is encountered in obtaining a stable homogeneous sizing composition. This is due to the high degree of hydrophobicity of the fatty acid lubricant. The hydrogenated fatty acid ester lubricant is used in an amount from about 8 to 12 percent by weight and preferably 9 to 11 percent by weight based on the ingredients of the sizing composition other than water.

The cationic lubricant is typically the amine salt of a fatty acid, such fatty acids being the same as those hereinbefore recited. However, it is preferable that the fatty acid moiety of the salt has between about 12 and 22 carbon atoms. The amines useful for forming the salt are tertiary amines of substantially low molecular weight, i.e. the alkyl groups attached to the nitrogen atom should have between 1 and 6 carbon atoms. This cationic lubricant aids in the processing of the glass fiber strand and the roving formed therefrom by imparting slip to the exterior of the strand or roving as it passes over various types of processing equipment.

The cationic lubricant is used in an amount from about 0.5 to about 2 percent by weight and preferably from about 0.75 to about 1.5 percent by weight based on the ingredients of the sizing composition other than water.

The emulsifying system of the sizing composition is of particular importance so that acceptable stability may be obtained in the sizing composition which is in emulsion form. This is a particular problem because of the use of the saturated fatty triglyceride lubricant in conjunction with the epoxy film former. This is due to the fact that the fatty acid ester lubricant and the epoxy resin are substantially diverse in chemical structure and emulsifiers used to emulsify the epoxy resin are diverse from those used to emulsify the fatty acid ester lubricant; and in some cases destabilization occurs when the fatty acid ester lubricant is added to an emulsion containing the epoxy resin. Thus, the emulsifier system used in the instant sizing composition is of critical importance. A dual emulsifier system is utilized; one emulsifier being propylene glycol - ethylene oxide reaction product and the second one being a polyethylene glycol. The ethylene oxide - propylene glycol reaction product is F-108 manufactured by BASF Wyandotte Chemical Company. The polyethylene glycol emulsifier is TRITON® X-100 which is manufactured by Rohm & Hass Company. The ethylene oxide - propylene glycol emulsifier should be of sufficient molecular weight to impart a melting point to the compound of 50° to 65° C. and preferably 55° to 57° C. The polyethylene glycol emulsifier is substantially lower molecular weight than the propylene glycol - ethylene oxide emulsifier. Typically the viscosity of the polyethylene glycol emulsifier should be between 150 and 400 centipoise at 25° C. and more preferably between 200 and 300 centipoise at 25° C. The propylene glycol - ethylene oxide emulsifier is used in an amount from about 1 to 3 percent by weight and more preferably between about 1.5 to 2.5 percent by weight based on the ingredients of the sizing composition other than water. The polyethylene glycol emulsifier is used in an amount from about 0.5 to about 1.5 percent by weight and more preferably between about 0.8 and 1.2 percent based on the total weight of the ingredients of the sizing composition other than water. These ranges of emulsifiers are necessary in order to form stable emuulsion so that both the epoxy resin and the hydrogenated fatty acid ester lubricant can form a stable emulsion, along with the proper particle size for effective application to the glass fibers. This particle size is typically between 0.1 and 1.5 microns and more preferably about 0.3 micron. When the particle size is above 1.5 microns, inefficient application of the sizing composition to the glass fibers during forming is encountered and destabilizing of the emulsion begins to occur.

The coupling agent which is used to promote bonding between the polyester resin matrix and the glass fiber size is used in an amount from about 4 to 10 percent by weight based on the ingredients of the sizing composition other than water. Typically the silane coupling agents have one portion of the molecule consisting of a highly hydrolyzable group such as $$-\underset{|}{\overset{|}{\text{Si}}}\text{OR}$$

wherein R is an alkyl group having from 1 to 5 carbon atoms, preferably 1 to 2 carbon atoms. It is desirable for the other portion of the molecule to be reactive with the resin matrix; such groups being acrylic, amino or epoxy. It has been found that silane coupling agents such as glycidoxyalkyl trialkoxysilanes, methacryloxyalkyl trialkyoxysilanes and amino alkyl trialkyoxysilanes are of particular utility in bonding the fibers to the resin matrix. More particularly, gamma-aminopropyltrimethoxysilane, methacryloxypropyltrimethoxysilane and glycidoxypropyltrimethoxysilane are useful for this purpose. When methacryloxypropyltrimethoxysilane is used as a coupling agent, the methoxy groups must be hydrolyzed before it is incorporated into the sizing composition. This is accomplished by adding acetic acid to the coupling agent and stirring for a sufficient time and at a sufficient temperature to hydrolyze the

group to form methanol and

Sufficient water is used in its hydrolysis to impart sufficient activity to the acetic acid. Other glass fiber sizing ingredients may be used in the sizing composition of the invention. Such other ingredients being wetting agents, anti-foaming agents and the like. A typical wetting agent is octylphenoxypolyethyleneoxyethanol (IGEPAL® CA-630 manufactured by the GAF Corporation). Anti-foaming agents which are used are the silicone anti-foaming agents such as SAG® 470 manufactured by Union Carbide.

Other emulsifiers may be used to impart further stability to the sizing composition so long as they are nonionic or cationic emulsifiers. These emulsifiers are known to those skilled in the art.

In preparing the sizing composition it is desirable that the solids be between 4 and 10 percent by weight and preferably 6 to 7 percent by weight with the remaining portion being water. The size is applied to the fibers to obtain a solids application of 0.5 to about 2 percent by weight based on the total weight of the fibers and the sizing composition and more preferably between about 0.5 and 1 percent by weight. The pH of the sizing composition should be controlled between about 5 and 7 and preferably between about 5.2 and 6.2.

The following example is illustrative of one method of preparing the size of the invention and the application of the size to glass fibers during forming. The size formulation is formulated as follows:

| Ingredient | Amount (grams) |
|---|---|
| EPON® 828 | 5,260.6 |
| Reaction product of partial ester maleic anhydride and an epoxy resin | 1,768.6 |
| Propylene glycol-ethylene oxide polymer F-108 manufactured by BASF Wyandotte Chemical | 453 |
| Hydrogenated corn oil (PURECO® oil) | 2,630.3 |
| Polyethylene glycol emulsifier (TRITON® X-100) | 272.1 |
| Octylphenoxypolyethyleneoxyethanol | 3,491.9 |
| Polyvinylpyrrolidone film former | 8,752.5 |
| Methacryloxypropyltrimethoxysilane | 1,043.1 |
| Acetic acid | 60 |
| Gamma-glycidoxypropyltrimethoxysilane | 1,043.1 |
| Fatty acid amine salt EMERY® 6717 | 317.5 |
| Anti-foaming agent SAG® 470 manufactured by Union Carbide Corporation | 55 |
| Anionic emulsifier P-105 manufactured by Wyandotte Chemicals Corporation | 272.1 |
| Cationic emulsifier L-62LF manufactured by Wyandotte Chemicals Corporation | 45.3 |
| Sufficient water to make 378.5 liters of size composition | |
| pH 5.8 ± 0.2    Mix solids 6.5 ± 0.2 percent | |

To a main mix tank is added 94.63 liters of deionized water. To a premix tank is added 10 liters of deionized water and the acetic acid with agitation. The methacryloxypropyltrimethoxysilane and the glycidoxypropyltrimethoxysilane is slowly added to the premix tank. After the addition of the silanes is completed, the mixture is agitated for 5 minutes or until a clear blue color is obtained. Subsequently, the mixture is agitated for 5 minutes and then transferred to the main mix tank containing the water. Forty liters of hot (60° to 72° C.) water is added to the premix tank. The polyvinylpyrrolidone is then added with agitation. After the addition the agitation is continued for 15 minutes until the solution is gray in color. To a mixing tank equipped with an EPPENBACH® mixer is added EPON® 828 epoxy resin, the reaction product of a partial ester of maleic acid and an epoxy containing material, the F-108, the CA-630, the PURECO® Oil and the TRITON® X-100 in the aforementioned sequence. The above mixture is heated to 49° C. at which time the EPPENBACH® high shear agitator is turned on, and hot water at a temperature of 60° to 70° C. is added to the tank until an oil and water emulsion is produced. After the emulsion is formed, the agitator is turned off and the emulsion is added to the main mix tank with agitation. Ten liters of hot water (60° to 72° C.) is added to a premix tank at which time EMERY® 6717, the fatty acid amine salt is added with agitation. The solution is agitated for 15 minutes or until solution is complete. The solution is then added to the main mix tank. The anti-foaming agent is mixed 50-50 with the deionized water and added to the main mix tank with agitation. The solution is brought to a final volume of 378.5 liters.

The reaction product of the partial ester of the polycarboxylic acid containing one or more unesterified carboxyl groups with the compound containing more than 1 epoxy is formed as follows. One mole of maleic anhydride was admixed with the monoethylether of polyoxyethylene glycol having an average molecular weight of 750 (CARBOWAX® 750). The admixture is heated with stirring for 2 hours at 180° C. 1.0 mole of 3,4 epoxy cyclohexylmethyl 3,4 epoxy cyclohexane carboxylate is added to the reaction mixture and heating at 180° C. is continued for an additional 2 hours. A water soluble reaction product resulted.

The above sizing composition was applied to glass fibers during formation. Glass fibers were pulled from a bushing at 2,962 meters per minute and the sizing composition was applied by a roller type applicator which was immersed in the sizing composition; the applicator speed being at 120 revolutions per minute. The fibers were then gathered into strand and wound on a 20.955 centimeter collet. The fibers had a filament diameter of 0.00126 centimeter to 0.000395 centimeter.

The forming package was removed from the collet and cured at 132° C. for 11 hours. A plurality of such forming packages were mounted on a creel and roving was formed therefrom. The roving was baked for 4 hours at 124° C. The dried residue of the size constituted 0.7 ± 0.15 percent of the strand. The glass fiber strand formed into roving with minimal fuzzing and other processing problems.

Polyester glass fiber reinforced panels were formed from the above sized glass fiber roving. The glass dispersed throughout the polyester resin homogeneously and had very little buildup of glass fibers on the chopping apparatus. The wet-out of the glass by the polyester resin was excellent.

Other ingredients and processes than those recited in the example may be used to practice the invention and the invention is only to be limited insofar as set forth in the accompanying claims.

I claim:

1. A glass fiber sizing composition comprising a phenolic epoxy resin; the reaction product of a partial ester of a polycarboxylic acid containing 1 or more unesterified carboxyl group with a compound containing more than one epoxy group; a dual emulsifier system; one emulsifier being a polyethylene glycol, the second emulsifier consisting essentially of the reaction product of propylene glycol and ethylene oxide; a saturated fatty triglyceride; and a silane coupling agent.

2. The sizing composition of claim 1 wherein said reaction product of the partial ester of a polycarboxylic acid containing one or more unesterified carboxyl group with a compound containing more than one epoxy group consists essentially of reaction product of maleic anhydride, a monomethyletherpolyethylene glycol having a molecular weight of about 750 and 3,4 epoxy cyclohexylmethyl 3,4 epoxy cyclohexane carboxylate.

3. The sizing composition of claim 1 wherein said saturated fatty triglyceride is hydrogenated corn oil.

4. The sizing composition of claim 1 wherein said coupling agent is methacryloxypropyltrimethoxysilane.

5. The sizing composition of claim 1 wherein said silane coupling agent is glycidoxypropyltrimethoxysilane.

6. Glass fibers having thereon the sizing composition of claim 1.

* * * * *